May 27, 1941.  W. H. O'CONNOR  2,243,508
MACHINE FOR REMOVING SKIN
Filed April 13, 1938  3 Sheets-Sheet 1
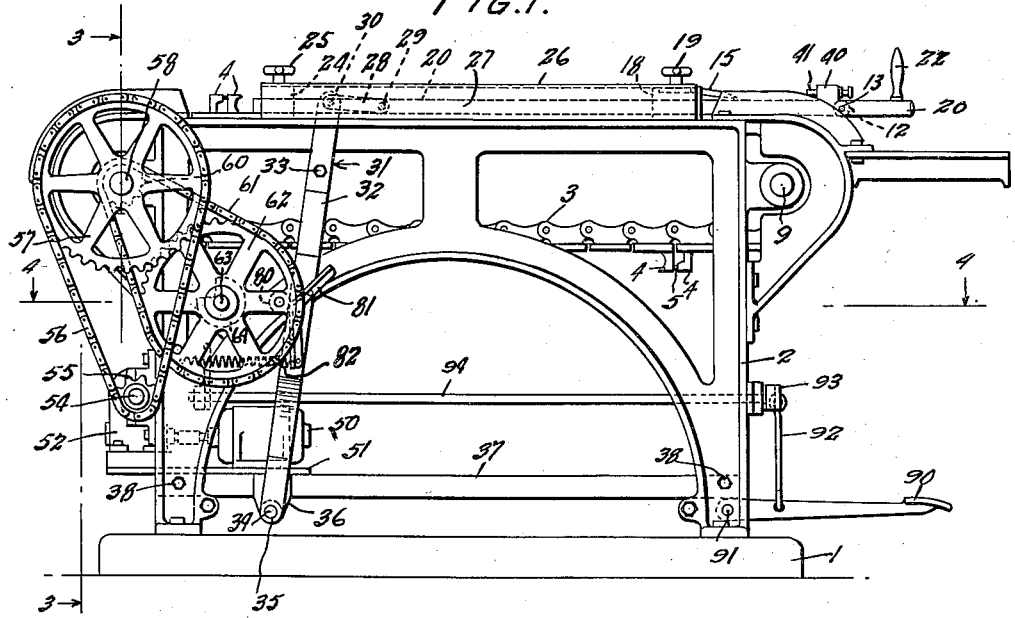
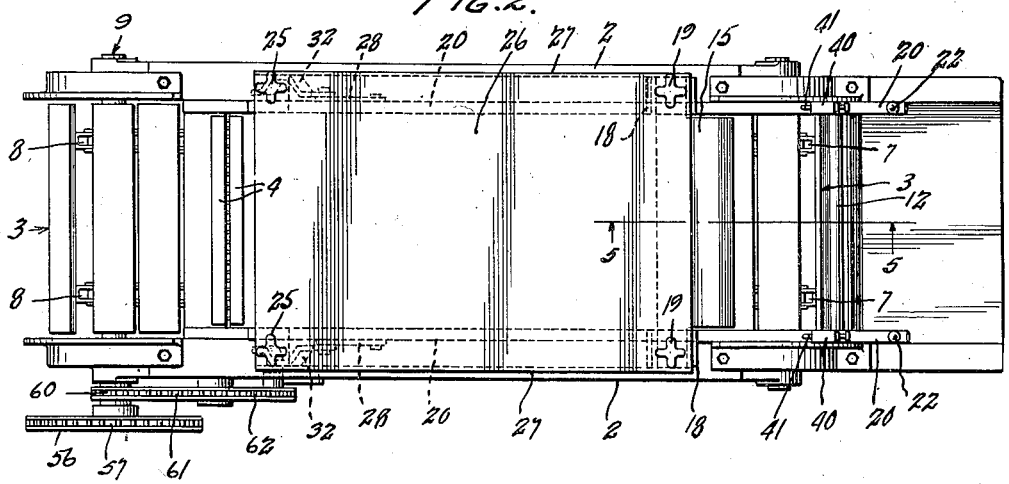
Inventor
WILLIAM H. O'CONNOR
By Semmes, Keegin & Semmes
Attorneys

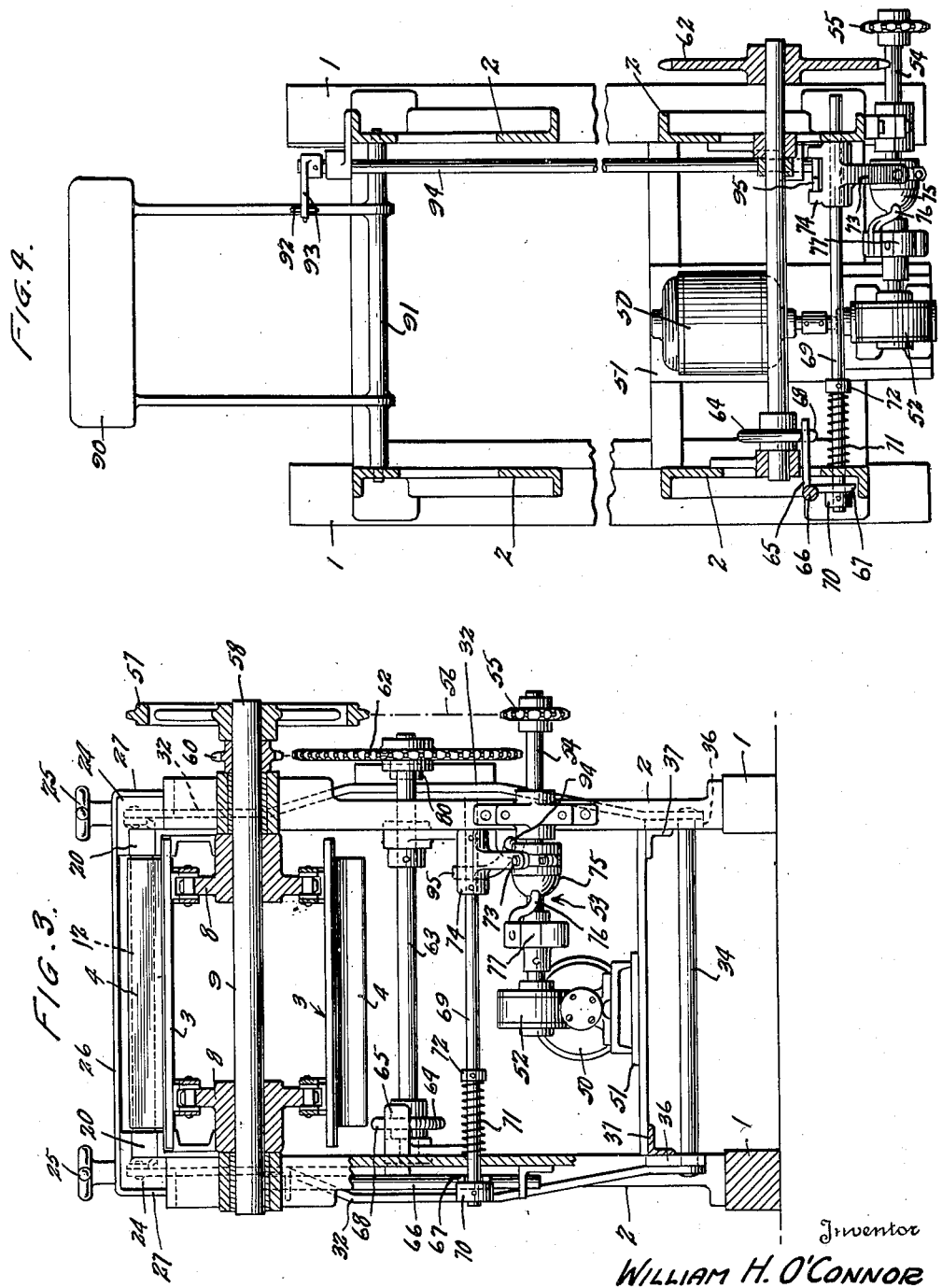

May 27, 1941.  W. H. O'CONNOR  2,243,508
MACHINE FOR REMOVING SKIN
Filed April 13, 1938  3 Sheets-Sheet 3
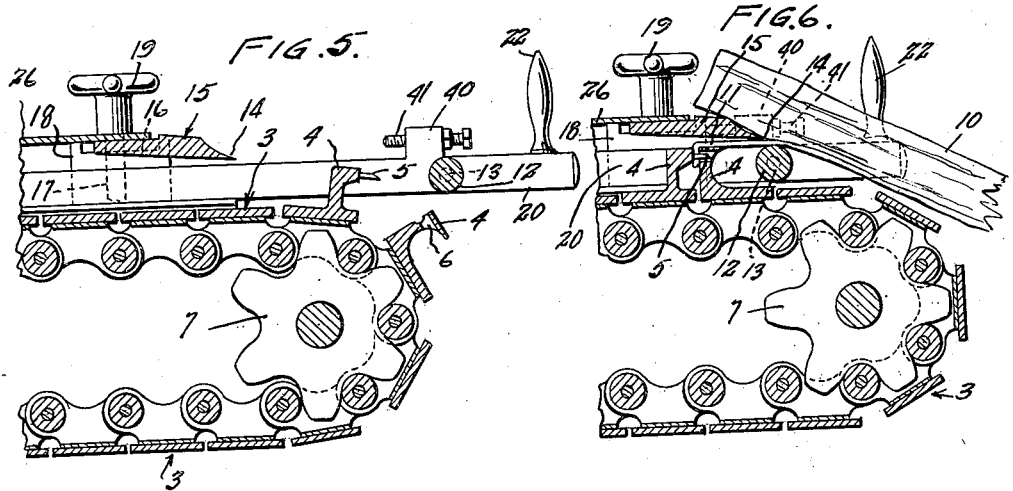
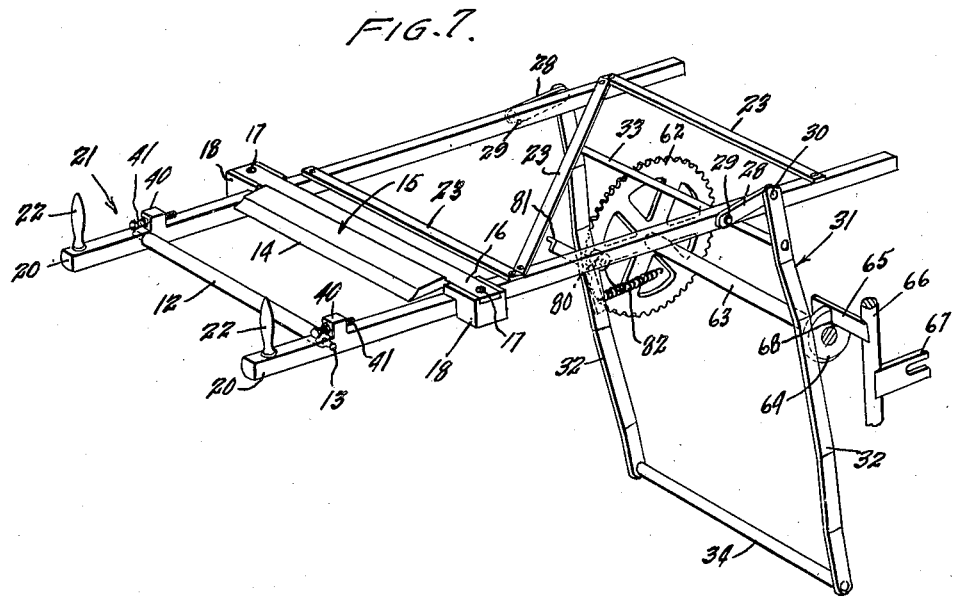
Inventor
WILLIAM H. O'CONNOR
By Semmes, Keegin & Semmes
Attorneys Patented May 27, 1941

2,243,508

UNITED STATES PATENT OFFICE 2,243,508

MACHINE FOR REMOVING SKIN

William H. O'Connor, East Orange, N. J.

Application April 13, 1938, Serial No. 201,847

9 Claims. (Cl. 146—130)

My invention relates to a machine for removing skin from meat, and more particularly relates to a machine for removing the skin from pork slabs.

The invention comprises a movable conveyor having gripping means on the conveyor which are adapted to grip the skin of the pork slab which is being operated upon. The gripping means comprises upright members having engaging grooves and teeth on opposite adjacent upright members which grip the skin of the pork slab at the loading station. At the loading station is located a roller which at the time of loading is moved transversely in the direction of movement of the slab from the cutting knife. However, after the automatic stopping of the conveyor mechanism which carries the grasping means and upon loading of the machine the roller moves from its inoperative position to its operative position adjacent and just below the knife blade. This roller acts to bend the pork slab so that the skin is more easily cut from the slab and the cutting is closer to the skin than would be the case were the roller not present.

In addition to the automatic stopping of the conveyor at the time of loading, I have provided means for manual starting of the conveyor which is effected by means of the foot treadle linkages that will be hereinafter described.

An object of the invention is to provide a gripping means for the skin which is simple in construction and positive in operation.

Another object of the invention is to provide a roller to bend or shape the slab so that the skin may be removed from the slab with as little waste meat adhering to the skin as possible.

Yet another object of the invention is to provide an automatic stop for the mechanism when the mechanism reaches a loading position or station.

A still further object of the invention is to provide means for moving the shaping roller for the slab into inoperative position at the time of loading, from whence, by manual operation, it may be moved into operative position.

Still another object of the invention is to provide a raised table over the feed conveyor so that the skin slabs may be received thereon directly from the knife.

With these and other objects in view, which may be incident to my improvements, the invention consists in the parts and combinations to be hereinafter set forth and claimed, with the understanding that the several necessary elements comprising my invention may be varied in construction, proportions and arrangement, without departing from the spirit and scope of the appended claims.

In order to make my invention more clearly understood, I have shown in the accompanying drawings means for carrying the same into practical effect without limiting the improvements in their useful applications to the particular constructions which, for the purpose of explanation, have been made the subject of illustration.

In the drawings:

Figure 1 is a view in side elevation of my machine;

Fig. 2 is a top plan view of the machine shown in Figure 1;

Fig. 3 is a view taken along the line 3—3 of Figure 1, looking in the direction of the arrows;

Fig. 4 is a view taken along the line 4—4 of Figure 1, looking in the direction of the arrows;

Fig. 5 is a view taken along the line 5—5 of Figure 2, looking in the direction of the arrows;

Fig. 6 is a view similar to the view shown in Figure 5, showing the shaping roller in operative position under the knife edge and a slab of pork in position being skinned;

Fig. 7 is a perspective view of a frame support for the shaping roller and a portion of the automatic operating mechanism for moving the shaping roller to the loading position.

Referring to the drawings I have shown my device mounted on a base 1. The device comprises metallic side frames 2, which may be suitably attached to the base 1. Adapted to move between the frames 2 is a slat conveyor 3. On the slat conveyor 3, at two or more stations, are mounted upright members 4 which are formed on adjacent slats of the conveyor. One upright member 4 carries a series of teeth 5 which fit into grooves or recesses 6 carried by the other upright 4. In Figure 5 is shown a detail of this mechanism, the teeth 5 being without the slots 6 and the whole mechanism being in the loading position. The slat conveyor is adapted to run on sprocket wheels 7 at the loading end of the machine, and drive sprocket wheels 8, shown in detail in Figure 3. The drive sprocket wheels are mounted on a shaft 9.

The position of the uprights 4 when they are gripping the skin of a slab of pork are illustrated in detail in Figure 6. A slab of pork 10 has its skin 11 gripped in the gripping mechanism formed in the uprights 4. The pork slab is being passed over a roller 12 mounted on a shaft 13. The roller 12 bends the slab 10 so that a knife edge 14 of a knife 15 cuts close to the skin 11, wasting but a minimum of the food value in the slab 10. The knife 15 may be integrally formed with a supporting member 16 which is suitably attached by screws, or other attaching means, 17 to supporting blocks 18. The screws 17 may be provided with operating handles 19 so that they can be readily removed.

The supporting blocks 18 are rigidly attached to the frames 2 of the device. Adapted to reciprocate in grooves formed in the blocks 18 are parallel bars 20 of a reciprocating framework which I have indicated generally by the numeral 21. Each parallel bar 20 is provided with a handle grip 22. Bracing bars 23 are provided to hold the parallel bars in the desired position. The bars 23 are suitably attached by rivets or bolts to the parallel bars 20. The shaft 13 of the shaping roller 12 is journaled in the parallel bars 20. In order to provide for reciprocation of the parallel bars 20, blocks 24, somewhat similar in configuration to blocks 18 before described, are provided at the other end of the supporting frames 21. These blocks 24 are held in place by means of screws provided with hand grips 25 corresponding to the hand grips 19 at the other end of the framework.

There is provided a table 26 formed of sheet metal and having bent down edges 27. This table is held in place over the blocks 18 and 24 by means of the screws operated by the hand-holds 19 and 25, respectively.

In order to reciprocate the framework 21, I have provided links 28 which are pivoted to the parallel bars 20 at 29, and which are pivoted at their other ends, as indicated at 30, to an operating framework 31 comprising side bars 32 joined at their top by a bracing bar 33, and at their bottom by a pivot shaft 34. The pivot shaft 34 is pivoted at 35 on downwardly projecting supports 36 carried by supporting channel irons 37, attached at 38 to the framework members 2.

In order to limit the "in" or operative position of the shaping roller 12 I have provided means for limiting the movement of the reciprocating framework 21. In Figures 5 and 7 I have shown upstanding supports 40 formed on the parallel bars 20 which carry adjusting screws 41. These adjusting screws limit the movement of the reciprocable framework 21 in one direction since they contact against the blocks 18. This permits the position of the shaping roller 12 to be adjusted to the best possible operating condition.

The machine is driven by an electric motor 50, mounted on a platform 51 between channel supports 37. Through a reduction gearing, indicated generally by the numeral 53 and which will later be described, a shaft 54 is rotated. The shaft 54 drives a small sprocket wheel 55 which, through a chain drive 56, drives a large sprocket wheel 57 carried by a shaft 58 on which latter (also numbered 9) are also mounted the sprocket wheels 8 which drive the slat conveyor 3. The shaft 58 is journaled in suitable bearings formed in the side frames 2, and carries a small sprocket wheel 60 which, through a chain 61, drives a large sprocket wheel 62. The large sprocket wheel 62 is mounted on a shaft 63 which carries at its other end a cam 64 which controls the automatic disengagement of the motive power from the slat conveyor, as will be later described.

The cam 64 is adapted to contact with a cam follower 65 attached to a shaft 66 having a control yoke 67. When the sprocket wheel 62 is moved, as viewed in Figure 7, in a clockwise direction a sufficient distance, cam follower 65 will be engaged by a notch 68 in the cam 64 and the shaft 66 will be rotated to move the yoke 67. Yoke 67 fits over a reciprocating operating bar 69 journaled for reciprocative motion in the frames 2. The yoke 67 is adapted to bear against an operating collar 70 formed on the reciprocating operating bar 69. A spring 71 is adapted to hold the parts in the position shown in Figure 3, the spring 71 bearing against the framework 2 at one end and against a collar 72 mounted on the rod 69 at the other end.

Against the tension of the spring 71, the yoke 67, when moved under the pressure of the notch 68 on the cam 64, will reciprocate the operating rod 69 to the left, viewing the parts in the position shown in Figure 3. This will cause clutch fingers 73 mounted on a base 74 carried by the rod 69 to move a conical operating member 75 reciprocably mounted on the shaft 54 to the left from the position shown in Figure 3. The conical surface 75 engages a clutch finger 76 which operates clutch surfaces, not shown, in the clutch casing 77 to cause these clutch surfaces to engage, thereby imparting rotation to the shaft 54. As long as the parts are held in the position just described, shaft 54 will be rotated. As soon, however, as the members assume the position shown in Figure 3, the shaft 54 ceases to rotate.

While the shaft 54 is rotating, the slat conveyor 3 is caused to move. As soon as shaft 54 ceases to rotate, the slat conveyor 3 ceases to move. Yoke 67 will operate to tension the spring 71 only while the cam 64 is engaging the cam follower 65. When the cam 64 is no longer engaging the cam follower 65, the parts will assume the position shown in Figure 3 in which no rotative motion is imparted to the shaft 54, and the slat conveyor 3 is at rest. When the slat conveyor 3 is at rest, the shaping roller 12 should be in the "out" position, as indicated in Figures 5 and 7. In order to accomplish this I have shown a roller 80 mounted on the sprocket wheel 62, which is adapted to engage an angle iron cam surface 81 formed on one of the side bars 32 of the operating framework 31. The rotation of the sprocket wheel 62 is in a clockwise direction, viewing the parts from the position in which they are shown in Figure 7. The roller 80 has pushed the operating framework 31 to the left and the shaping roller 12 is in the "out" position. With a little more rotation of the sprocket wheels 62, the roller will engage the upper slanted surface of the cam member 81 and the framework 31 will pull the parts back into the position shown where the shaping roller 12 lies directly under the knife blade 14. The power for moving the framework 31 to cause the reciprocating framework 21 to assume the desired position for cutting is a spring 82 which is attached at one end to the cam member 81 and at the other end to one of the side frames 2. This is plainly shown in Figure 1.

In the position of the parts shown in Figure 6, the set screws 41 are in contact with the blocks 18 and the exact position of the shaping roller 12 can be determined by giving the proper set to the set screws 41.

In the position of the parts shown in Figure 5 and Figure 7, the apparatus is in a loading position. The conveyor has been stopped because the clutch 77 is not in engagement to rotate the shaft 54. The gripping members carried by the supports 4 on adjacent slats of the conveyor are in the open position, see Figure 5, and the shaping roller 12 is in the "out" or inoperative position.

Now, in order to start the mechanism, I have shown a manual control which comprises a foot treadle 90 mounted on a shaft 91 journaled in the side frames 2. Attached to the foot treadle is a connecting link 92 which is attached at its top to an operating bar 93 which is affixed to a rocker shaft 94 suitably journaled in supports carried by one of the side frames 2. The shaft 94 has an operating arm 95 which is adapted to bear against the support 74 on the reciprocating rod 69. By moving the reciprocating rod 69 to the left, viewing the parts in the position shown in Figure 3, clutch 77 is thrown into the "in" position and shaft 54 starts to rotate. This causes shaft 63 to rotate through the train of sprocket gears and chains, above described, and this causes cam follower 65 to be engaged by the cam 64 which will hold the rod 69 in its position against the tension of the spring 71 to maintain engagement of the clutch surfaces in the clutch 77 so that by stepping on the treadle the slat conveyor is again caused to travel under the power of the motor. This travel of the slat conveyor 3 will continue until cam follower 65 is no longer engaged by the cam 64. By that time another loading station will have been reached and the operation will be repeated.

Thus it will be seen that automatically at each loading station the gripping mechanism is opened into the open position, the shaping roller is moved into the out position, giving plenty of room to insert the skin of the pork between the gripping members. Upon manual operation through the treadle, the slat conveyor will be started again, and the spring 82 will pull the reciprocating framework 21 of parallel bars 20 into the position in which the shaping roller 12 lies directly beneath the blade of the knife. When the cam 64 no longer engages the cam follower 65, the motion of the slat conveyor will cease, but by that time the pork has been skinned and the piece of pork 10 is lying on the table 26, and another gripping means is in position for receiving the skin of another piece of pork. At this time the gripping means will close on the pork skin, the shaping roller 12 will be automatically placed in position underneath the cutting edge of the knife blade, and another slab of pork will be properly skinned.

The skins are released at the discharge end where the conveyor passes over the drive sprocket wheels 8. Here the pins 5 come out of their position within the grooves 6 and release the skin. It is to be noted that the teeth or pins 5 are pointed backward from the direction of travel of the conveyor, thus facilitating the release of the skins.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention, or exceeding the scope of the appended claims.

I claim:

1. A conveyor mechanism for slabs of pork having skin thereon, comprising a slat conveyor upon whose upper surface the skin of the slab is adapted to rest, raised supports carried by adjacent slats projecting above the upper surface of the slat conveyor, grasping means carried by the raised supports adapted to grasp the edge of skin of the slab and hold its engaged edge above said upper surface, and a wheel over which the slat conveyor passes to open the grasping means adjacent a loading position.

2. A conveyor mechanism for slabs of pork having skin thereon, comprising a slat conveyor upon whose upper surface the skin of the slab is adapted to rest, raised supports carried by adjacent slats projecting above the upper surface of the slat conveyor, teeth carried by one said support, and grooves in the other said support so that the skin can be held by the teeth.

3. In a conveyor mechanism for slabs of pork having a skin thereon, a slat conveyor upon whose upper surface the skin of the slab is adapted to rest, raised supports carried by adjacent slats projecting above the upper surface of the slat conveyor, teeth carried by one of said supports and grooves in the other said support so that the skin can be held by the teeth, a loading station, said teeth being adapted to move out of the grooves when the raised supports arrive at the loading station, a knife, the knife having a cutting edge, said knife being positioned above the conveyor and at a point adjacent the loading station, a roller over which the slab is bent adjacent the cutting edge of the knife, the roller in its inoperative position being located away from the cutting edge of the knife and in its operative position positioned adjacent and below said knife and above the slat conveyor and means to stop the slat conveyor when said raised support reaches the loading station.

4. In a pork slab skinning mechanism for pork slabs having skins therein, a conveyor, a drive therefor, gripping means carried by the conveyor to grip the skin, said gripping means being positioned above the upper surface of the conveyor and including teeth that are adapted to be fitted into grooves in gripping position, automatic means to stop the conveyor when the gripping means reaches the loading position, means to remove the teeth from the grooves at such loading position, manually operated means to cause the conveyor to resume its motion, a knife extending transversely with respect to the conveyor and positioned above the conveyor, and a roller arranged to be moved adjacent to and below the knife and above the level of the conveyor in operative position to bend the slab adjacent the cutting edge of the knife.

5. A device for removing the skin from pork slabs comprising a conveyor, a drive therefor, a knife extending transversely with respect to the conveyor and disposed above the conveyor, said knife having a cutting edge, gripping means carried by the conveyor to grip the skin, automatic means to arrest motion of the conveyor when the gripping means reaches the loading position, a roller adapted to be moved to a position adjacent to and below the level of the knife and above the conveyor in operative position, said roller being adapted to bend the slab adjacent the cutting edge of the knife, and automatic means to move the roller to an inoperative position away from said knife.

6. A device for removing the skin from pork slabs comprising a conveyor, a drive therefor, a knife extending transversely of the conveyor and positioned above the surface of the conveyor, a cutting edge on the knife, gripping means carried by the conveyor to grip the skin, automatic means to stop the conveyor when the gripping means reaches the loading position, a roller adapted to be moved to a position adjacent and below the level of the cutting edge of the knife and above the surface of the conveyor, said roller being adapted to bend the slab adjacent the cutting edge of the knife, automatic means to move the roller away from the cutting edge of the knife in the loading position and manual means to start the conveyor at the loading position.

7. In a conveyor mechanism for slabs of pork having a skin thereon, a slat conveyor upon whose upper surface the skin of the slab is adapted to rest, raised supports carried by adjacent slats projecting above the upper surface of the slat conveyor, teeth carried by one of said supports and grooves in the other said support so that the skin can be held by the teeth, a loading station, a wheel at the loading station over which the slat conveyor passes to move the teeth out of the grooves, a knife, the knife having a cutting edge and positioned above the conveyor at a point adjacent the loading station, a roller over which the slab is bent adjacent the cutting edge of the knife, the roller in its inoperative position being located away from the cutting edge of the knife and in its operative position positioned adjacent and below the knife and above the slat conveyor, the knife edge and roller providing a uniform orifice through which the skin is drawn, and means to stop the slat conveyor when the raised support reaches the loading station.

8. A conveyor mechanism for slabs of pork having a skin thereon, comprising a slat conveyor upon whose upper surface the skin of the slab is adapted to rest, raised supports carried by adjacent slats projecting above the upper surface of the slat conveyor, teeth carried by one of said supports and grooves in the other said support so that the skin can be held by the teeth, a knife extending transversely with respect to the conveyor and disposed above the conveyor, said knife having a cutting edge, a roller adapted to be moved to a position adjacent to and below the level of the knife and above the conveyor in its operative position, the roller being adapted to bend the slab adjacent the cutting edge of the knife, the knife edge and roller providing a uniform orifice through which the skin is drawn, and means to move the roller to an inoperative position away from the knife.

9. In a conveyor mechanism for slabs of pork having a skin thereon, a slat conveyor upon whose upper surface the skin of the slab is adapted to rest, raised supports carried by adjacent slats projecting above the upper surface of the slat conveyor, teeth carried by one of said supports and grooves in the other said support so that the skin can be held by the teeth, a loading station, a wheel at the loading station over which the slat conveyor passes to move the teeth out of the grooves at the loading station, a knife, said knife having a cutting edge and being positioned above the conveyor at a point adjacent the loading station, a roller over which the slab is bent adjacent the cutting edge of the knife, the roller in its inoperative position being located away from the cutting edge of the knife and in its operative position disposed adjacent and below the knife and above the slat conveyor, the knife edge and roller providing a uniform orifice through which the skin is drawn, automatic means to stop the conveyor when the raised supports arrive at the loading position, automatic means to move the roller away from the cutting edge of the knife in the loading position, and manual means to start the conveyor at the loading position.

WILLIAM H. O'CONNOR.